April 13, 1943.  D. BIERMANN  2,316,390
POWER TRANSMISSION
Filed Dec. 18, 1940    4 Sheets-Sheet 1
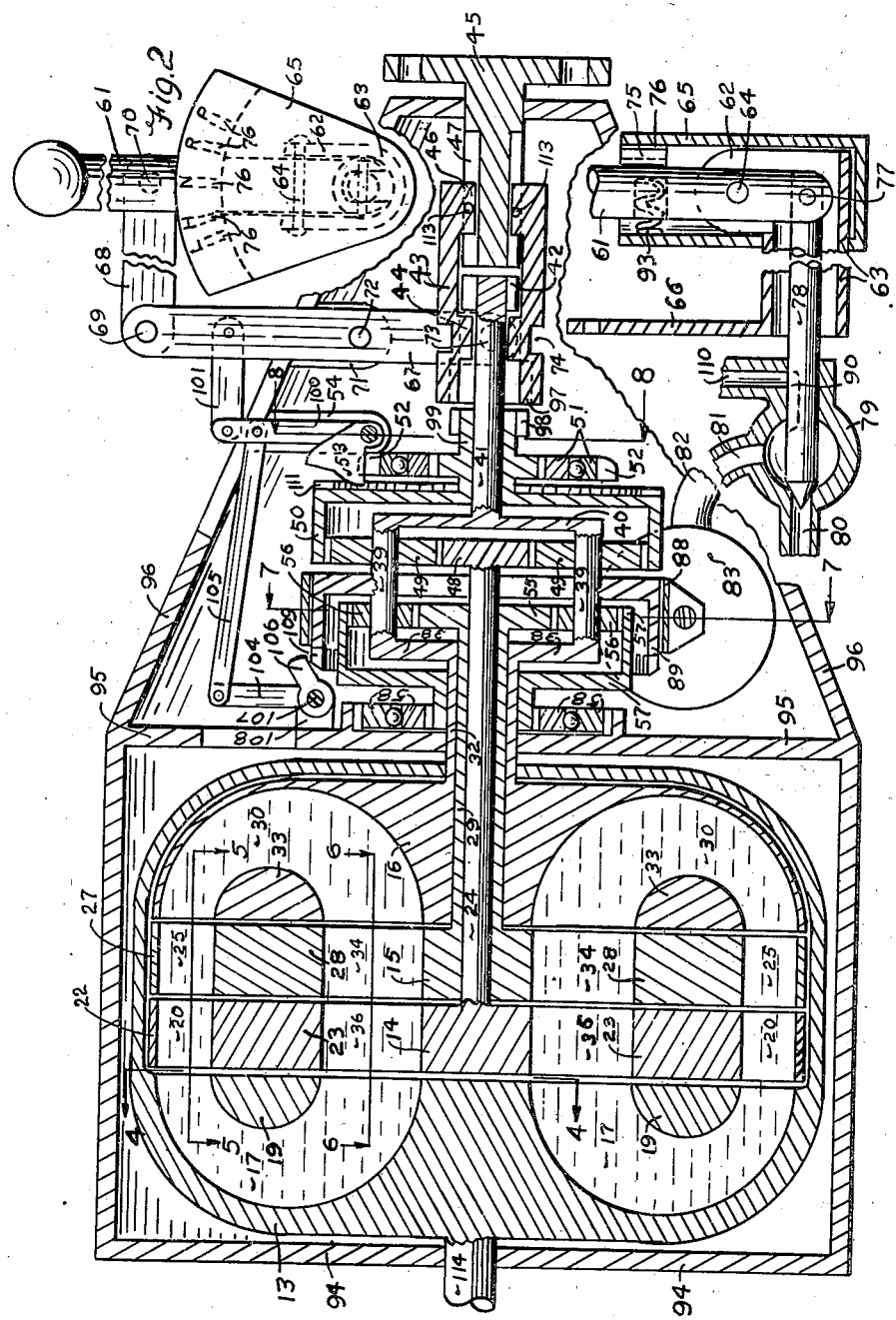
David Biermann
INVENTOR.

April 13, 1943.  D. BIERMANN  2,316,390
POWER TRANSMISSION
Filed Dec. 18, 1940  4 Sheets-Sheet 2

David Biermann
INVENTOR.

April 13, 1943.    D. BIERMANN    2,316,390
POWER TRANSMISSION
Filed Dec. 18, 1940    4 Sheets-Sheet 4
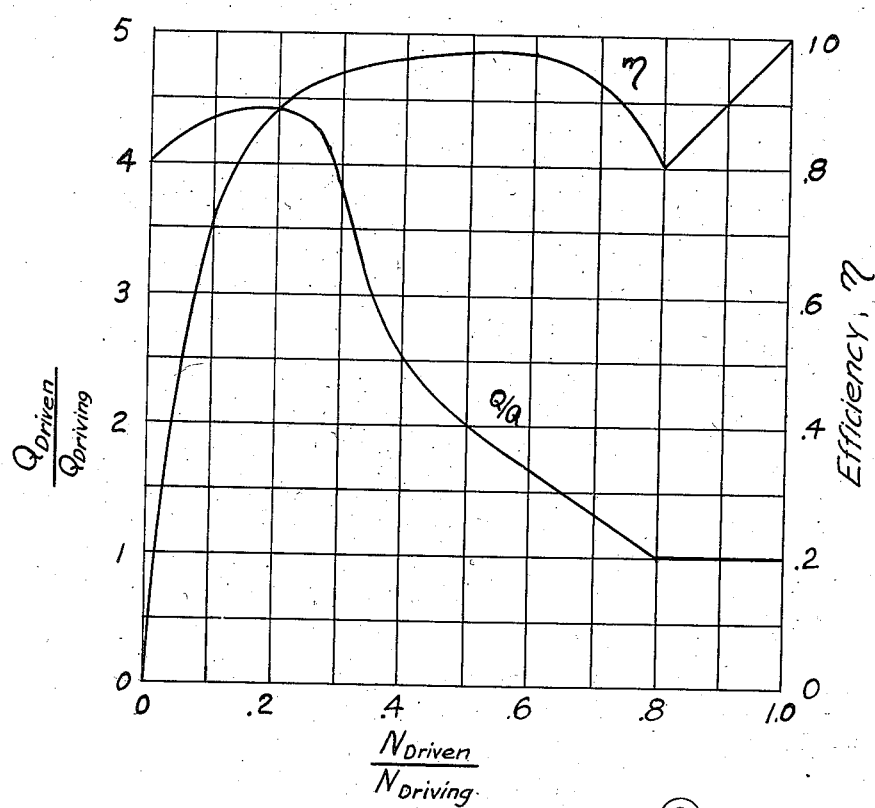
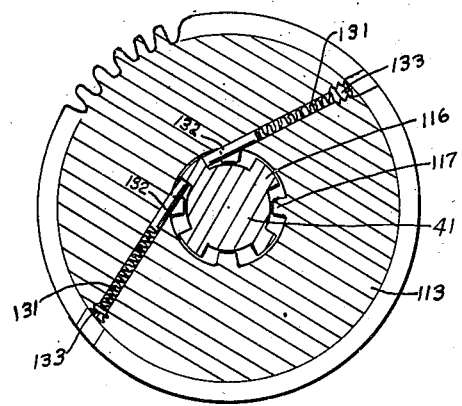
Fig. 12.
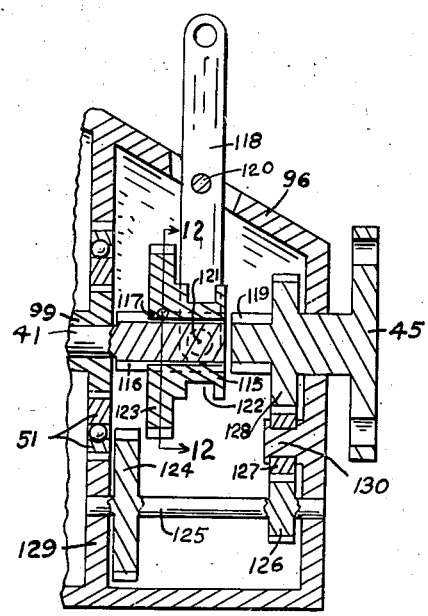
Fig. 11
David Biermann
INVENTOR Patented Apr. 13, 1943

2,316,390

UNITED STATES PATENT OFFICE 2,316,390

POWER TRANSMISSION

David Biermann, Hampton, Va.

Application December 18, 1940, Serial No. 370,659

1 Claim. (Cl. 74—189.5)

The present invention relates to power transmitting apparatus, and more particularly to hydro-mechanical speed changing power transmissions.

The invention herein disclosed is of the type of transmission in which two or more fluid clutches are used in conjunction with planetary gears to obtain certain desired operating characteristics. The fluid clutches are used to transmit the driving torque in a smooth manner to members geared or directly coupled to the driver shaft in such a way that speed reduction and torque multiplication continuously changes under certain operating conditions as will be described hereinafter.

In hydro-mechanical transmissions for automobiles heretofore developed of the type under consideration the most common forms utilize a single fluid clutch and a multiple of gears which are shifted either manually or by auxiliary control means to obtain different torque and speed relations. These transmissions have been extremely complicated, almost without exception, and they lack complete smoothness of operation when the gears are shifted.

To meet the requirements of a transmission for use with modern automobiles, I have devised a simple automatic mechanism which can be produced at a cost comparable with that of a conventional transmission and yet which is capable of providing nearly ideal operating characteristics.

Accordingly, a primary object of the present invention is to provide novel hydro-mechanical transmissions of extremely simple, rugged, and low cost construction, adapted for use with modern internal combustion automobile engines.

Another object of the invention is to provide hydro-mechanical transmissions embodying novel automatic and manual control mechanisms.

Still another object of the invention is to provide means for progressively changing the gear ratio in a smooth uninterrupted manner, said gear change being a function of the speed of the automobile and the torque load on the engine.

Yet another object is to provide methods for easy shifting of mechanical clutches.

A further object is to provide means for manually locking the transmission in low speed.

Other objects of the invention are such as may be attained by a utilization of the various combinations and principles hereinafter set forth in the varied relations to which they are obviously applicable by those skilled in the art.

The invention will be best understood and further objects will appear from a study of the following detailed description taken in connection with the accompanying drawings, with the understanding, however, that the invention is not confined to any strict conformity with the showing in the drawings, but may be changed and modified as long as such changes mark no material departure from the salient features of the invention as expressed in the appended claims.

In the drawings:

Figure 1 is a vertical section taken longitudinally through a preferred embodiment of my invention.

Figure 2 is a plan view of the remote control lever shown linked to the control system of the transmission.

Figure 3 is a vertical section taken through the remote control lever shown in Figure 2.

Figure 10 is the calculated torque and efficiency characteristics of the transmission based on the velocity diagram given in Figure 9.

Figure 11 is a partial vertical section taken longitudinally through the rear part of the transmission showing an alternative arrangement of the mechanical clutch and reversing mechanism.

Figure 12 is a vertical section taken along line 12—12 of Figure 11.

Figure 4:
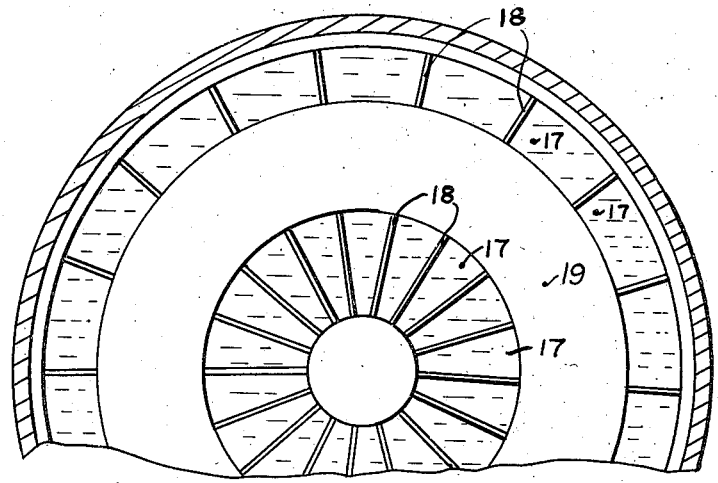
Figure 4 is a vertical section taken on line 4—4 of Figure 1.
Figure 5:
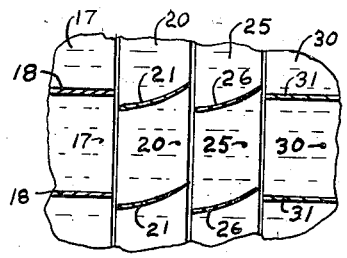
Figure 5 is a partial horizontal section taken on line 5—5 of Figure 1.
Figure 6:
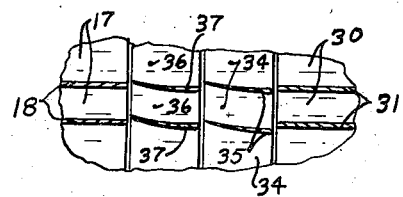
Figure 6 is a partial horizontal section taken on line 6—6 of Figure 1.

In the drawings briefly described above in which like reference characters designate like parts, the transmission is shown completely assembled in Figure 1 and adapted to be mounted in any manner between a source of power and a driven shaft, with its forward (left) end arranged to be driven from said power source and its rear (right) end adapted to transmit multiplied torques to said driven shaft.

The transmission is mounted within a supporting housing made up of two sections, the front housing 94, and the rear housing 96, separated by diaphragm 95. Contained within housing 94 is a unique fluid coupling or a combination radial and axial turbine which receives torque from driving shaft 114 and transmits said torque into the rear housing 96 by means of either or all of three concentric shafts which will be explained later. Contained within rear housing 96 are the mechanisms for multiplying the torque, reversing the rotational direction, clutching and declutching as will be explained more fully presently.

*Fluid coupling or turbine.*—The fluid coupling is comprised of four separate members: driving element 13, which provides a container for driving fluid; first intermediate driven element 14; second intermediate driven element 15; and the final driven element 16. These four members are all independently rotatable about an axis also common to the drive shaft 114; and they are all supported directly or indirectly by bearings contained within front housing 94 and diaphragm 95.

Referring to Figures 1, 4, 5, and 6, it may be seen that a number of curved fluid passages 17 are formed in driving element 13. Each passage 17 is separated from the adjacent passage by radial vane 18, all of which are fastened to element 13. Island 19 is carried by vanes 18. Passages 17 are arranged to receive fluid in an axial direction at a short radial distance from the axis of rotation, and to turn the fluid approximately 180 degrees to discharge it at a greater radius. Thus rotational motion transmitted from element 13 to the fluid contained in passages 17 sets up a centrifugal force acting to circulate the fluid in a combined radial-axial-rotational direction.

Fluid leaving passages 17 in element 13 enters outer passages 20 formed in element 14 and impinges on outer vanes 21 carried between rim 22 and island 23, which transmits torque to the hub of element 14 and to shaft 24.

Fluid leaving outer passages 20 in element 14 enters outer passages 25 formed in element 15 and impinges on outer vanes 26 carried between rim 27 and island 28, which transmits torque to the hub of element 15 and to shaft 29.

Fluid leaving outer passages 25 enters passages 30 formed in final driven element 16 and impinges on radial vanes 31 carried by element 16 which transmits torque to sleeve shaft 32. Island 33 is carried by vanes 31 and forms one side of passages 30. Fluid entering passages 30 at the outer entrance is turned through approximately 180° and discharged at a smaller radius in a combined rotational and axial direction.

Fluid leaving passages 30 enters inner passages 34 formed in element 15 and impinges on vanes 35 carried between island 28 and the hub of element 15.

Fluid leaving passages 34 enters inner passages 36 formed in element 14 and impinges on vanes 37 carried between island 23 and hub of element 14.

Fluid leaving passages 36 re-enters passages 17 in element 13 thus completing the circuit.

It is quite obvious to those skilled in the art that the velocity of fluid circulation and the directions of flow throughout the cycle will depend upon a number of variables such as: relative rotational velocities between the four members of the fluid coupling, the shape and angles of the various vanes, and several other minor variables. It is also quite clear that the amount of torque transmitted at any instant from the driving element 13 to any of the driven elements will depend upon the rate of change in angular momentum of the fluid times the radius to the mean flow passageway; which will depend in turn upon the variables previously mentioned. By gearing elements 14 and 15 at certain different ratios to element 16, which is directly coupled to the final driven shaft, and by setting vanes 21, 26, 35, and 37 at certain angles it is possible to obtain very desirable characteristics of the transmission which will be explained more fully later.

Figure 7:
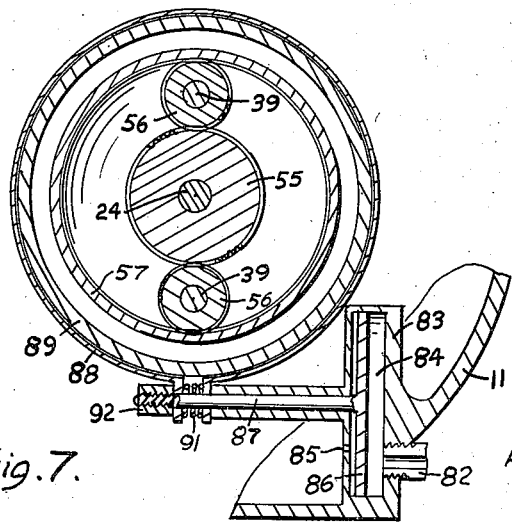
Figure 7 is a vertical section taken on line 7—7 of Figure 1.
Figure 8:
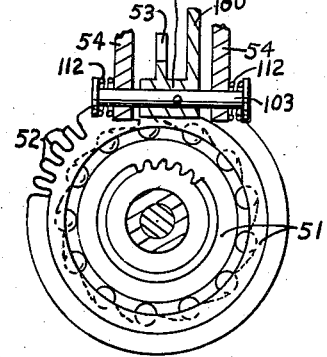
Figure 8 is a vertical section taken on line 8—8 of Figure 1.

*Torque multiplying gears.*—Referring to Figures 1, 7, and 8, means for multiplying and transmitting the applied torque to the final driven shaft are illustrated. In the description of the fluid coupling the separate torques transmitted to elements 14, 15, and 16 was seen to be passed on to concentric shafts 24, 29, and 32 respectively. Shaft 32 is directly coupled to spider 38, planet shafts 39, spider 40, shaft 41, and spline teeth 42. When dog clutch 43 is set for forward operation, spline teeth 42 engage with teeth 44 which couples shaft 41 to driven shaft 45, since spline teeth 46 and 47 are constantly engaged. Thus element 16 is directly coupled to driven shaft 45 for forward operation.

Shaft 24 is directly connected to sun gear 48 which meshes with planet gears 49 carried on shafts 39. Planet gears 49 also mesh with ring gear 50, which is arranged to transmit the reaction torque to the frame through the over running brake assembly 51, brake teeth 52, engaging pawl 53, brackets 54 to housing 96. Thus the torque carried by shaft 24 is multiplied by gears 48, 49, and 50 and transmitted to the driven shaft through a means previously described: viz. shafts 39, 41, etc.

Sleeve shaft 29 is directly connected to sun gear 55 which meshes with planet gears 56 which in turn are carried on spider shaft 39. Planet gears 56 also mesh with ring gear 57 which transmits the reaction torque to housing diaphragm 95 by way of over running brake assembly 58. Thus the torque carried by shaft 29 is multiplied by gears 55, 56, and 57 and transmitted to the driven shaft through a means previously described; viz. shafts 39, 41, etc.

In the above description the driving torque was seen to enter the transmission from shaft 114 and divided into three parts while passing through the fluid coupling. The division of torque was seen to depend upon the detail design of the fluid coupling as well as the relative rotational speeds of the four elements. In the description of the gearing it was seen that the three fluid coupling driven elements (14, 15, and 16) were all coupled, either directly or through torque multiplying gears, to the driven shaft 45. This means that the three elements 14, 15, and 16 will rotate at different speeds; the values will depend upon the gear ratios employed. It was seen that the torque reaction of two geared drives was taken out to the housing through over-running brakes, which means that these geared drives can produce driving torque only in one direction (the same direction as the applied torque). In other words the torques supplied to the driven shaft 45 by the two geared drives and one direct drive can only add. As soon as any of the torque values in either of the geared drives changes to a minus value it ceases to exist. Obviously, when either of the over-running brakes 57 or 58 start to free wheel, the entire geared assembly of each associated drive and its attached fluid coupling element will also free wheel or rotate as a unit at substantially the same speed as driving element 13. When both the geared drives are free wheeling then the driving torque will pass through the transmission by way of the remaining direct drive path, neither increased by gears nor decreased any appreciable amount by fluid losses, gear, or bearing friction. The rotational speeds of driving shaft 114 and driven shaft 45 will tend to become equal except for a small slippage in the fluid coupling.

The purpose of the two intermediate coupling elements 14 and 15 and their associated torque multiplying gears is to multiply the applied torque for conditions of operation when driven element 16 is stopped or rotating at any speed substantially lower than that of driving element 13. All the torque entering the fluid system through shaft 114 must also pass out through either or all of shafts 24, 29, and 32. As previously mentioned, the division of torque will depend upon the relative rotational speeds of the four fluid units and upon the detail design. Up to the moment of free wheeling, the relative rotational speeds of the three driven elements 14, 15, and 16 is definitely determined by the gear ratios of the two planetary gear trains. Thus if shaft 24 is geared to shaft 41 by a train of gears having a ratio of 0.33 then element 14 will rotate at three times the speed of element 16; and if shaft 29 is geared to shaft 41 by a train of gears having a ratio of 0.67 then element 15 will rotate at 1.5 times the speed of element 16. The gear ratios employed will largely determine the division of torque in the fluid coupling at various ratios of the driven to driving shaft speeds, because they determine the relative speeds of driven elements 14 and 15 to the driving element 13; which in turn determines largely the angles at which the fluid leaving passages 17 impinges upon blades 21 and 26.

Figure 9:
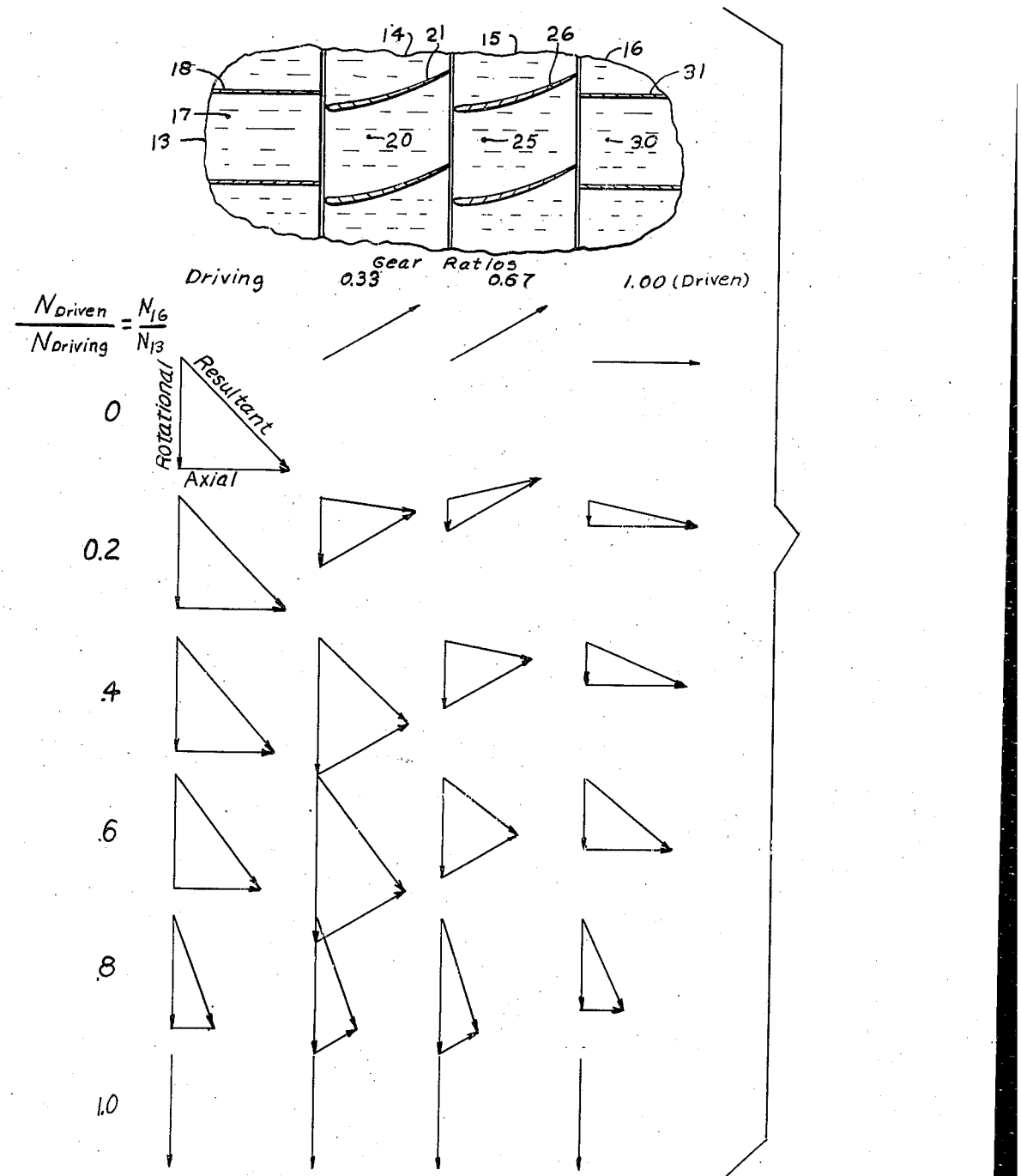
Figure 9 is a diagram showing the component velocities of the fluid as it passes through section 5—5 of Figure 1.

The other important factor determining the division of torque in the fluid coupling is the geometric angle settings of the various blades. In Figure 9 is a diagram showing the component velocities of the fluid as it leaves passages 17, 20, and 25 and as it enters passage 30 for different ratios of the driven to driving shaft speed ($N_{16}/N_{13}$) This diagram is based on certain assumed gear ratios and blade angle settings and does not apply to other values. The change in the angle and the velocity of the resultant flow as it passes through each passage is a measure of the torque transmitted to that element. Thus when $N_{16}/N_{13}=0$, a large positive torque is transmitted to element 14, none to element 15, and a negative torque to element 16. Since the sum of the torques leaving the system must equal the torque entering, then $Q_{14}-Q_{16}=Q_{13}$ or $Q_{14}=Q_{13}+Q_{16}$. This means that the torque transmitted by element 14, which will be multiplied 3 times, is greater than the applied torque; and that transmitted by element 16, which is not multiplied, will act against that transmitted by element 14. For $N_{16}/N_{13}=.2$ a large portion of the applied torque is transmitted by element 14, a small portion by element 15, and a small portion by 16 in the reverse direction. At $N_{16}/N_{13}=.4$ most of the torque is taken out through element 15 and multiplied by 1.5. At $N_{16}/N_{13}=.6$ the torque in element 14 is seen to be equal to about zero; over-running brake 51 will then release ring gear 50 so that element 14 will float in the fluid stream passing through it. Element 15 is seen to be taking most of the load while element 16 is still transmitting a small negative torque. At $N_{16}/N_{13}=.8$ element 16 is seen to have taken over the load from element 15. Over-running brake 58 will then release ring gear 57 and allow element 15 to float in the fluid stream passing through it. At $N_{16}/N_{13}=1.0$ all four elements are seen to be rotating as a unit.

In Figure 9 it may be noted that the axial component of flow diminishes as $N_{16}/N_{13}$ increases. This can be explained by the fact that as element 16 speeds up a centrifugal force is generated in the fluid contained within passages 30 which tends to counteract that generated in passages 17 leaving less force or pressure to circulate fluid through the system. As $N_{16}/N_{13}$ approaches unity the flow of fluid approaches zero and the entire fluid coupling together with the fluid and all the rotatable parts of the transmision rotates substantially as a unit. Under such conditions the efficiency also approaches unity. A small slippage of the fluid coupling is necessary in order to convey torque, however, but it is ordinarily small for high rotational speeds.

In Figure 10 is the calculated torque and efficiency characteristics for the transmission based on the velocity diagram given in Figure 9. The starting torque applied to the driven shaft is seen to be over four times the driving torque. This progressively decreases until the driven and driving torques become equal at a value of N driven/N driving of 0.8. The efficiency is seen to average over 90 percent for 80 percent of the transition range.

*Control mechanisms.*— Means for actuating mechanical clutch 43 is shown in Figures 1, 2, and 3, together with other mechanisms for controlling the operation of the transmission. Control lever 61, which would be located convenient to the operator, is supported on lugs 62 attached to column 63 by means of pin 64. Column 63 is rotatable within fixed sector frame 65 and is arranged to transfer one component of the motion of lever 61 to lever 66. Lever 66 is connected to clutch lever 67 by means of link 68, pins 69 and 70. Lever 67 is pivoted on lugs 71, attached to housing 96, by means of pin 72; and is provided with lug 73 which fits into slot 74 of clutch 43. Movement of control lever 61 to the left from the neutral (N) position shown in Figures 1 and 2 moves clutch 43 to the right and engages spline teeth 42 with teeth 44 thereby coupling shafts 41 and 45 for forward or high (H) operation.

Spline teeth 42 and 44 cannot be engaged, however, unless shafts 41 and 45 are both stationary. Although shaft 45 is stationary when the automobile is stopped, shaft 41 would not be unless special provisions were incorporated to stop said shaft 41 during the shifting period. Braking of shaft 41 is accomplished as follows:

Control lever 61 is provided with lug 75 which is arranged to fit in slots 76 formed in sector frame 65. Lug 75 serves to locate lever 61 and also necessitates rotating said lever 61 about pin 64 before a shift from one position to the other can be made. Rotation of lever 61 about pin 64 transmits longitudinal movement through pin 77 to valve stem 78, and opens valve 79 for the passage of fluid to or from ports 80, 81, and 110. In the present invention provisions are made for using vacuum for actuating the braking device, the source of said vacuum could be the manifold of the engine or a vacuum pump connecting with port 80. Positive pressure of air or oil could be used with a slightly different arrangement of the parts. Port 81 is connected with pipe 82, shown in Figures 1 and 7, which is tapped into cylinder 83. A reduction in pressure in space 84 causes air to flow through port 85 and move piston 86 and rod 87 which clamps brake band 88 on to drum 89 causing said drum to lock. Since drum 89 is fastened to planet shafts 39 shaft 41 is also stopped. Lever 61 is then shifted to a new position and lug 75 is allowed to slide into a slot 76 through the action of spring 93. This closes port 80 and allows air to enter valve 79 through port 110 and slot 90 which equalize pressure on the two sides of piston 86. Spring 91 then returns rod 87, piston 86, and brake band 88 to their normal or free position. Nut 92 is provided for adjustment.

Reversing the direction of rotation of driven shaft 45 may be accomplished in any number of obvious ways, two of which will be described: In Figure 1 is shown one means. Although this is seen to be a simple solution it may not be the best from the standpoint of ease of shifting the dog clutches necessary, the gear ratio may not be correct for the best operational characteristics. An alternative reversing mechanism is shown in Figure 11 which does not have the objections noted above. The reversing mechanism shown in Figure 1 will be described first.

For reversing the direction of rotation of shaft 45, shown in Figures 1, 2, and 3, lever 61 is moved until lug 75 fits into slot 76 marked R. This motion is transferred to lever 67 and dog clutch 43, which is moved to the left, engaging spline teeth 97 with spline teeth 98. Teeth 98 are fastened to shaft 99 which is in turn connected with ring gear 50. During this shifting operation, motion from lever 67 is transferred to lever 100 (see also Figure 8) through link 101. This motion is carried to engaging pawl 53 through sleeve 102 carried on shaft 103, said pawl 53 is disengaged from teeth 52 of the over-running brake 51.

Motion from lever 100 is also carried to lever 104 through link 105, said lever 104 is directly connected to shifting pawl 106 in the same manner as is lever 100 connected to pawl 53. Lever 104 and pawl 106 are mounted on shaft 107 which is supported by lugs 108. Shifting lever 61 to the R position engages pawl 106 with teeth 109 mounted on drum 89.

With ring gear 50 coupled to driven shaft 45, and planet shafts 39 locked, torque from element 14 is transmitted through shaft 24, sun gear 48, to planet gears 49 and applied to ring gear 50 in a reversed direction and at a multiplied value. The torque reaction is carried to diaphragm 95 through drum 89, teeth 109, pawl 106, and lugs 108.

Since planet shafts 39 are locked, then fluid coupling element 16 is likewise locked. Element 15 is prevented from rotating in the same direction as element 14 because of the locking of planet shafts 39 and the over-running brake 58, which prevents rotation of ring gear 57 in a direction opposite to that of element 15.

The multiplication of torque for reverse will be greater than the gear ratio because there will be additional torque multiplication in the fluid coupling. Referring to Figure 9 it can be seen that if the rotational component of the fluid is reversed in direction in traveling through passages 20, then the impact on vanes 21 will be greater than that applied by vanes 18. The reversed rotational component will be taken out by vanes 31, since they will be fixed, and the torque reaction of the fluid coupling will be carried out to diaphragm 95 through pawl 106.

Means for locking driven shaft 45 to prevent the vehicle from moving when it is parked is incorporated in this transmission. Movement of control lever 61 to the position marked P (see Figures 1, 2, and 3) effects coupling of shaft 45 with shaft 41 through the engagement of spline teeth 47 with teeth 46 and teeth 46 with teeth 42. Shaft 41 is locked through the action of pawl 106 engaging with teeth 109.

In case it is desired to lock the transmission in low gear in order for the engine to brake the vehicle when descending steep grades, control lever 61 can be moved to position marked L. This action engages pawl 53 with teeth 111 carried on ring gear 50 and prevents rotation of said gear 50. Element 14 is then forced to rotate at a speed several times greater than that of shaft 45 which will induce a fluid circulation in the coupling in the same direction as for normal high speed operation by virtue of the angle settings of blades 21 and 37. With circulation set up the interaction of the fluid on the several blades in the system will be such as to transmit torque from one element to the other tending to equalize their speeds. The engine will thereby be speeded up which will produce the desired braking effect.

In shifting from one control position to the other, provisions have been made for preventing relative movement of any of the mating parts except for the low-lock position. Another provision to facilitate the engagement of pawls 53 and 106 with teeth 52 and 109 respectively is also incorporated. In Figure 8 it may be seen that pawl 53 is mounted on shaft 103, which is arranged to slide axially a limited distance as well as to rotate. Springs 112 keep shaft 103 centered between lugs 54 when pawl 53 is not engaged. In shifting control lever 61, if pawl 53 does not align itself with slots formed between teeth 52, shaft 103 will slide axially in either direction by virtue of the centering action of pawl 53 (which has a knife edge) without the application of excessive force. Although not shown, pawl 106 is also provided with this feature.

The same principle is also applied to dog clutch 43 to facilitate shifting (see Figure 1). A large clearance is provided between teeth 46 and 47. Springs 113 keep teeth 47 centered between teeth 46 when clutch 43 is not engaged. When shifting, clutch 43 may rotate slightly in either direction against the action of springs 113 so that either teeth 44 may easily engage teeth 42 or teeth 97 may engage teeth 98.

There is a certain problem connected with releasing of either of the pawls 53 or 106 or the clutch 43 against the drag of the fluid coupling. Provisions are incorporated to reduce the friction to a minimum. Pawls 53 and 106 are both wedge shaped so that any side force will tend to disengage them and thereby nearly offset the effect of friction. Similarly, teeth 98 and 97 are cut on a spiral in such a direction that the applied torque will tend to disengage them; likewise are teeth 42 and 44. The pitch is so calculated that the clutch will remain engaged under operating conditions.

If the above provisions were not sufficient to enable easy shifting a booster cylinder could easily be attached to lever 67.

The alternative reversing mechanisms previously mentioned are shown in Figures 11 and 12, which would replace the parts shown in Figure 1 to the rear (or right) of section 8—8, and also eliminate pawls 53 and 106 and their actuating mechanisms. The same parts shown in both Figures 1 and 11 are designated with the same character.

Torque from shaft 41 is transmitted to dog clutch 115 through spline teeth 116 and 117 fastened to shaft 41 and clutch 115 respectively. For forward operation clutch 115 is moved to the right by action from lever 118 and coupled with driver shaft 45 through mating of spline teeth 117 with teeth 119. Lever 118 is pivoted on shaft 120 which is in turn fastened to housing 86. The force required to shift clutch 115 is transmitted from lever 118 to lug 121 which fits in slot 122.

For reverse operation clutch 115 is moved to the left until gear 123 meshes with gear 124. The torque is then transmitted to shaft 125, gear 126, idler gear 127, and gear 128 which is fastened to driven shaft 45. Shaft 125 is supported by bearings formed in housing 86 and diaphragm 129. Idler gear 127 is carried on housing 86 by means of shaft 130.

The torque reaction from shaft 99 is carried out to housing 86 through over-running brake assembly 51 supported in diaphragm 129.

In Figure 12 is shown in detail the means for providing easy shifting of clutch 115 to either the forward or reverse positions. It may be noted that a large clearance is provided between teeth 116 and 117, and that said clearance is equalized between the adjacent teeth faces for neutral position by means of springs 131 acting on pins 132. Springs 131 are compressed by screws 133. In shifting clutch 115, if teeth 117 do not mate with teeth 119 then the wedge shaped ends of said mating teeth will guide them into position by rotating clutch 115 against springs 131. This procedure also applies to shifting into reverse.

*Operation of the transmission on an automobile.*—This transmission has particularly desirable operating characteristics for motor vehicles in general. Its freedom from shifting of gears or clutches while driving in traffic and its extreme smoothness in operation combined with its high accelerating qualities makes it outstanding.

Before the engine is started, control lever 61 is placed in neutral position (N). The engine is then started and run at a low rotational speed. If it is desired to run in reverse, lever 61 is moved to position marked R. As soon as the shift has been completed there will be a slight tendency for the vehicle to roll backwards due to the transmission of a small torque through the fluid coupling. Increasing the engine speed increases this torque until the proper speed is reached. Stopping is accomplished by slowing down the engine speed and applying the brake.

Lever 61 can then be shifted to the high position (H). The engine speed can then be increased to any reasonable value depending upon the amount of starting acceleration desired. In any event the speed of the vehicle will increase in a smooth uninterrupted manner until the desired value is reached; whereupon all rotatable elements in the transmission will be rotating at slightly less than engine speed, for which the efficiency will be nearly unity.

In slowing down, the engine throttle is closed. Power from the wheels is then transmitted back through the transmission to the engine which acts to retard the forward speed. As the speed of the vehicle approaches zero the amount of torque transmitted by the fluid coupling also approaches zero so that the engine is free to run at idling speed. Stopping of the vehicle is accomplished through the use of brakes.

Resumption of forward speed is accomplished by increasing the engine speed, with brakes released.

It may be desirable to obtain a large braking effect from the engine when coasting down a steep hill or mountain side. In this event lever 61 is moved to low position, marked L. This action forces the power through one set of speed changing gears and tends to speed the engine up, which results in the desired braking effect.

In parking on a hillside it is often desirable to lock the wheels by a means more positive than the parking brake affords. This may be accomplished by moving lever 61 to the position marked P.

Having described certain preferred embodiments only of my invention, what is desired to be secured by Letters Patent and claimed as new is:

A rotary power transmission comprising a driving shaft; a driven shaft; a supporting fixed housing; a rotatable fluid tight housing coupled to said driving shaft; a centrifugal pump contained within and fastened to one end of said rotatable housing; a centrifugal motor facing said pump at the opposite end of said housing and rotatable independently of but cooperating with said pump for the purpose of transmitting torque from said pump to said motor through the interaction of fluid on blades carried by said pump and motor; two axial motors disposed between said centrifugal pump and centrifugal motor driven by the action of fluid impinging on blades carried by said axial motors, said fluid being circulated through the planes of said axial motors by said centrifugal pump and centrifugal motor; a central shaft connecting the axial motor which is adjacent to the pump to a sun gear of a planetary gear train; a plurality of planet gears meshing with said sun gear; a plurality of planet shafts carrying said planet gears and supported by a spider; a rotatable shaft coaxial with said driving and driven shafts connecting with said spider; a mechanical dog clutch arranged for coupling said spider and shaft with said driven shaft; a ring gear meshing with said planet gears and supported by a sleeve shaft encasing said spider shaft; one-way brake carried concentric with said ring gear sleeve shaft; a manually actuated dog clutch arranged for engaging with said one-way brake so that torque could be transmitted in a direction opposite to that of the driving torque from said ring gear to said fixed housing; a sleeve shaft concentric with said driving and driven shafts connecting said axial motor which is adjacent to said centrifugal motor to a sun gear of a second planetary gear train; a plurality of planet gears meshed with said second sun gear; a plurality of spider shafts carrying said second planet gears, said spider shafts mounted on said spider of said first named planetary gear train; a ring gear meshing with said second named planetary gears; a one-way brake carried by said second named ring gear assembly arranged for transmitting torque from said ring gear to said fixed supporting housing only in a direction opposite to that of the torque applied by said driving shaft; a sleeve shaft concentric to said driving shaft coupling said centrifugal motor with said planet gear spider; a brake arranged for manually locking said spider to said fixed supporting housing; a brake arranged for locking said first named ring gear to said fixed housing; and a control lever and cooperating linkages arranged for actuating the clutches and brakes in unison to accomplish either of the following: couple said spider shaft with said driven shaft and couple said first named one-way brake with said fixed housing for forward operation, couple said first named ring gear with said driven shaft and lock said spider to said fixed housing for reverse operation, couple said spider shaft with said driven shaft and lock said first named ring gear to said fixed housing for low operation, and release said driven shaft for neutral operation.

DAVID BIERMANN.